United States Patent [19]
Girard et al.

[11] Patent Number: 5,536,299
[45] Date of Patent: Jul. 16, 1996

[54] SIMULTANEOUS STEP PRESSURE SWING ADSORPTION PROCESS

[75] Inventors: Amanda K. Girard, Amherst; Herbert R. Schaub, East Amherst, both of N.Y.

[73] Assignee: Praxair Technology, Inc., Danbury, Conn.

[21] Appl. No.: 299,764

[22] Filed: Sep. 1, 1994

[51] Int. Cl.⁶ .................................................. B01D 53/047
[52] U.S. Cl. .................. 95/101; 95/102; 95/103; 95/105; 95/130
[58] Field of Search ............... 95/96–98, 100–105, 95/128, 130, 139

[56] References Cited

U.S. PATENT DOCUMENTS

| | | | |
|---|---|---|---|
| 2,944,627 | 7/1960 | Skarstrom | 183/4.7 |
| 3,430,418 | 3/1969 | Wagner | 95/100 |
| 3,564,816 | 2/1971 | Batta | 95/100 |
| 3,636,679 | 1/1972 | Batta | 55/26 |
| 3,738,087 | 6/1973 | McCombs | 95/130 X |
| 4,077,780 | 3/1978 | Doshi | 95/100 |
| 4,519,813 | 5/1985 | Hagiwara et al. | 95/130 X |
| 4,756,723 | 7/1988 | Sircar | 95/103 |
| 4,781,735 | 11/1988 | Tagawa et al. | 55/26 |
| 4,917,710 | 4/1990 | Haruna et al. | 95/102 |
| 5,015,271 | 5/1991 | Reiss | 95/96 X |
| 5,015,272 | 5/1991 | Okada et al. | 95/100 X |
| 5,122,164 | 6/1992 | Hirooka et al. | 55/26 |
| 5,223,004 | 6/1993 | Etéve et al. | 55/26 |
| 5,328,503 | 7/1994 | Kumar et al. | 95/101 |
| 5,330,561 | 7/1994 | Kumar et al. | 95/130 X |

Primary Examiner—Robert Spitzer
Attorney, Agent, or Firm—Alvin H. Fritschler

[57] ABSTRACT

Process swing adsorption processes for gas separation are carried out using overlapping pressure swing adsorption, feed gas repressurization and desorption steps. The adsorptive capacity of the system employed is increased, unit power consumption is decreased, and the overall efficiency of the operation is enhanced.

13 Claims, 1 Drawing Sheet

Low Purity O2
BED A — BED B
Machines Are Unloaded

Low Purity O2
BED A — BED B
Feed Air → ← Waste N2

BED A — Product O2
BED B
Feed Air → → Waste N2

BED A → Product O2 → BED B
Feed Air → → Waste N2

Low Purity O2
BED A — BED B
Machines Are Unloaded

Low Purity O2
BED A → ← BED B
Feed Air ← → Waste N2

BED A ← Product O2 BED B
Feed Air ← ← Waste N2

BED A ← Product O2 ← BED B
Feed Air ← ← Waste N2

SIMULTANEOUS STEP PRESSURE SWING ADSORPTION PROCESS

BACKGROUND OF THE INVENTION

1. Field of the Invention

This invention relates to the separation of feed gas mixtures containing less readily and more readily adsorbable components. More particularly, it relates to such gas separation using pressure swing adsorption (PSA) processing.

2. Description of the Prior Art

In numerous chemical processing, refinery, metal production and other industrial applications, high purity gas streams are frequently employed for a variety of purposes. For example, high purity oxygen is used in various industries, such as chemical processing, steel mills, paper mills and in lead and glass production operations. Many such applications require purities in the range of about 90–93% oxygen at flow rates of up to 100,000 cubic feet per hour or more. While oxygen and nitrogen can be produced by various air separation techniques, PSA processing is particularly suited for air separation in a variety of applications, particularly in relatively small sized operations for which the use of a cryogenic air separation plant may not be economically feasible.

In pressure swing adsorption (PSA) processing, a feed gas mixture containing a more readily adsorbable component and a less readily adsorbable component is commonly passed to an adsorbent bed capable of selectively adsorbing the more readily adsorbable component at an upper adsorption pressure. The bed is thereafter depressurized to a lower desorption pressure for desorption of the more readily adsorbable component and its removal from the bed, prior to repressurization and the introduction of additional quantities of the feed gas mixture to the bed as cyclic adsorption-desorption-repressurization operations are continued in the bed. In vacuum pressure swing adsorption (VPSA) processing, the lower desorption pressure is a subatmospheric, or vacuum, desorption pressure. Such PSA/VPSA processing is commonly carried out in multi-bed systems, with each bed employing a PSA/VPSA processing sequence on a cyclic basis interrelated to the carrying out of such processing sequence in the other beds of the adsorption system. In PSA/VPSA systems designed for the recovery of high purity oxygen product as the less readily adsorbable component of air, each adsorbent bed will commonly contain an adsorbent material capable of selectively adsorbing nitrogen as the more readily adsorbable component, with said nitrogen being subsequently desorbed and removed from the bed upon reduction of the pressure of the bed from the upper adsorption pressure level to a lower desorption pressure.

Various processing approaches have been developed for applying the PSA/VPSA technology for practical commercial operations, such as the above-indicated production of oxygen from feed air. In one such approach, a two bed VPSA system, having adsorbent material capable of selectively adsorbing nitrogen from feed air, is employed in a processing sequence having six basic steps carried out in each bed, on a cyclic basis, interrelated to the carrying out of such steps in the other bed. Thus, each bed undergoes the following steps: (1) pressurization from lower subatmospheric desorption pressure to an intermediate pressure, with pressure equalization gas being passed from the top, or product end, of the other bed, which is undergoing depressurization, to the top of the said bed; (2) pressurization from intermediate pressure to upper adsorption pressure by the introduction of feed air to the bottom, or feed end, of the bed; (3) feed-adsorption-oxygen product recovery, in which additional quantities of feed air are introduced to the bottom of the bed, and oxygen, the less readily adsorbable component thereof, is withdrawn from the top of the bed for product recovery and for bed purge purposes; (4) cocurrent depressurization in which gas is released from the top of the bed and is passed to the top of the other bed, which is undergoing repressurization, for pressure equalization between the beds at an intermediate pressure range; (5) evacuation, or countercurrent depressurization, to a lower subatmospheric desorption pressure, with release of gas from the bottom end of the bed; and (6) purge at said lower desorption pressure. In order to synchronize the cyclic operation for the two beds of the system, steps 1–3 are carried out in one bed, undergoing depressurization from the upper adsorption pressure to the lower desorption pressure and regenerating, while steps 4–6 are carried out in the other bed, undergoing repressurization from said lower desorption pressure to the upper adsorption pressure and use for the production of product gas. The total cycle time is relatively short, typically about 60 seconds.

In the practice of this processing cycle, the pressure equalization of step (1) causes an increase in pressure of the bed being repressurized, typically, from a lower, subatmospheric, or vacuum, desorption pressure of about 0.35 atm to an intermediate pressure of about 0.67 atm, with this increase in pressure of about 0.3 atm utilizing about 5–20% of the total cycle time. During this pressure equalization step, it will be understood that the feed and vacuum blowers employed for the two bed VPSA system are unloaded.

During the bed repressurization of step (2), feed air is passed to the bed to cause the pressure thereof to increase from the lower intermediate pressure level reached during the initial pressure equalization to an upper adsorption pressure in the superatmospheric range, typically about 1.3 to 1.5 atm.

Upon reaching the desired upper adsorption pressure, additional quantities of feed air are passed to bottom of the bed at said upper adsorption pressure, in step (3), with the more readily adsorbable nitrogen component thereof being selectively adsorbed, and the less readily adsorbable oxygen product being selectively passed through the bed and withdrawn from the top of the bed. The oxygen thus withdrawn is recovered as the desired oxygen product, except for a portion thereof that is diverted for use as purge gas, generally in the other bed. The oxygen withdrawn initially is typically recovered as product gas, with a portion of the oxygen being diverted for purge purposes during the latter portion of said step (3). The bed repressurization of step (2), and the initial portion of step (3) in which the oxygen withdrawn is generally recovered as product gas, utilizes a portion of the overall cycle time that varies depending on the overall conditions of the embodiment, but that is usually in the range of about 30–40% of the overall cycle time. The further portion of step (3), in which additional oxygen product is recovered, and a portion of the oxygen is diverted for purge purposes, commonly requires about 15–30% of the overall cycle time.

During the countercurrent depressurization-pressure equalization of step (4), the pressure decreases to an intermediate pressure determined in accordance with the pressure in the other bed, which is undergoing repressurization as a result of the pressure equalization between the beds. As with step (1), the change in pressure from the start to the end of step (4) is approximately 0.3 atm, with the bed typically reaching an intermediate pressure level in the range of about 0.9–1.1 atm. In this regard, it should be noted that the pressure equalization between the beds is commonly terminated at a partial pressure equalization, rather than being continued to a full pressure equalization between the beds. Thus, in common practice, the beds do not completely equalize at the same pressure, with the difference in pressure between the beds upon completion of the partial pressure equalization typically being from about 1 to about 10, desirably about 3 to about 5, psi.

Following cocurrent depressurization-pressure equalization, the bed being depressurized is evacuated to a lower, subatmospheric desorption pressure in step (5) of the processing cycle. In this portion of the regeneration of the bed, it is typically evacuated, using a vacuum blower, to the desired lower desorption pressure, e.g. 0.35 atm, with release of gas, i.e. previously adsorbed nitrogen, from the feed, or bottom, end of the bed.

In step (6) of the processing cycle, purge gas is introduced to the upper, i.e., product, end of the bed at the lower desorption pressure, e.g. 0.35 atm to facilitate removal of nitrogen from the bottom of the bed, with the purge gas being the portion of the oxygen product gas from the other bed that is diverted for such purge purposes.

Following the regeneration of each bed in steps (3), (4) and (5), it is repressurized, in steps (1) and (2), and product oxygen is produced in step (3) of the cycle with additional quantities of feed air being introduced to that bed as the processing sequence is carried out, on a cyclic basis, in each bed.

Those skilled in the art will appreciate that there are many other PSA and VPSA processes used for the production of oxygen from feed air. Each such approach may include its own unique steps or features, or combinations thereof. The particular process described above provides for the economical recovery of high purity oxygen in the range of 90–95%. While the process described has thus provided desirable benefits, there is a continuing desire in the art for further improvements in the PSA/VPSA processing. Such improvements are desired to satisfy the ever-increasing need for higher performance levels in the economical supply of oxygen and other industrial gases for a wide variety of commercial applications. Specifically, further improvement is desired to expand the capacity of PSA/VPSA systems, to increase the efficiency of the PSA/VPSA process, and to reduce the unit power requirements of PSA/VPSA operations.

It is an object of the invention to provide an improved PSA, including VPSA, process for the separation of gases.

It is another object to provide an improved PSA/VPSA, process for the recovery of high purity oxygen by air separation.

It is a further object of the invention to provide a PSA, including a VPSA, process having enhanced efficiency and reduced unit power, and being capable of expanding the adsorptive capacity of the systems employed therein.

With these and other objects in mind, the invention is hereinafter described in detail, the novel features thereof being particularly pointed out in the appended claims.

SUMMARY OF THE INVENTION

The PSA/VPSA process of the invention employs overlapping pressure equalization-rising and feed gas repressurization steps, as well as overlapping pressure equalization-falling and desorption or evacuation steps. As a result, the amount of feed gas that can be processed in a given unit of time is increased, the unit power requirements are reduced and the overall efficiency of the process is enhanced.

BRIEF DESCRIPTION OF THE DRAWINGS

The invention is hereinafter described in detail with reference to the accompanying single sheet of drawings in which.

DETAILED DESCRIPTION OF THE INVENTION

Figures 1, 1A, 2, 3, 4, 4A, 5, 6:
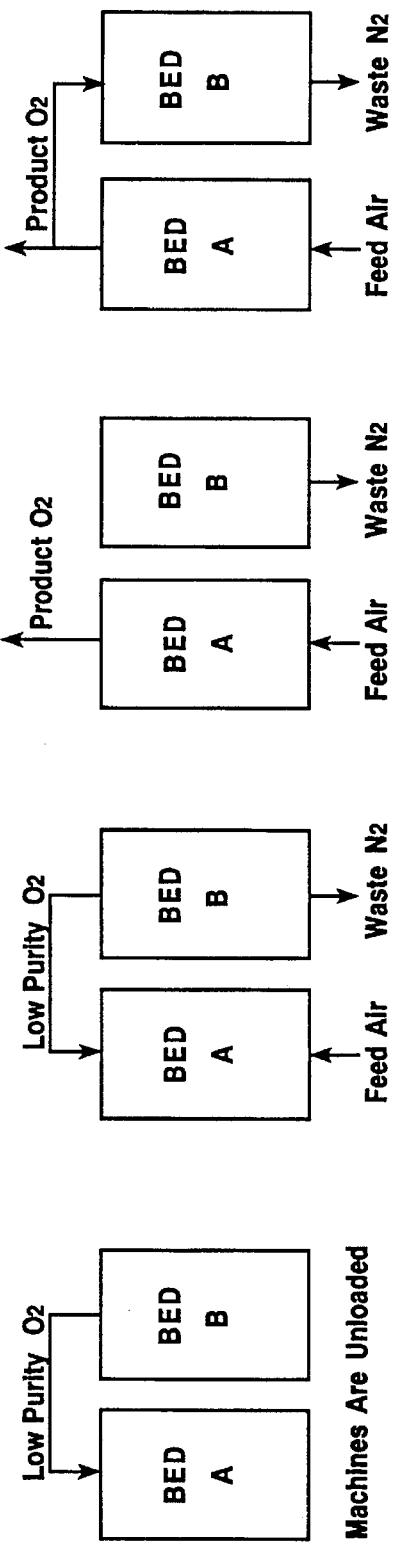
FIG. 1 illustrates Step 1 of the overall process of the invention.
FIG. 1A illustrates Overlap Step 1A of said process.
FIG. 2 illustrates Step 2 of said process.
FIG. 3 illustrates Step 3 of said process.
FIG. 4 illustrates Step 4 of said process.
FIG. 4A illustrates Overlap Step 4A of said process.
FIG. 5 illustrates Step 5 of said process.
FIG. 6 illustrates Step 6 of said process.

The objects of the invention are achieved by carrying out a PSA/VPSA processing sequence, such as that described above, using an overlap cycle in which the pressure equalization steps are overlapped with the next succeeding steps in the cycle. Thus, the bed undergoing repressurization from its lower desorption pressure is partially repressurized by means of pressure equalization between the beds, with a latter portion of the step being overlapped, or carried out simultaneously, with the next succeeding step of further repressurization with feed gas to the desired upper adsorption pressure. Likewise, the bed undergoing depressurization from the upper adsorption pressure is cocurrently depressurized with the gas being discharged from the top of the bed being passed to the top of the other bed to be repressurized for pressure equalization therebetween, with a latter portion of the step being overlapped with the next succeeding step of desorption, e.g. evacuation, with release of gas from the bottom end of said bed being depressurized.

The processing sequence of the invention has two significant advantages. The amount of gas flow in the pressure equalization steps is increased as a result of the inclusion of the overlap step and is found to increase the product recovery obtained in the operation of a PSA/VPSA system. Thus, more oxygen is retained in the system rather than being discarded in the regeneration portions of the overall cycle, as a result of the transfer of a larger amount of said oxygen to the other bed during cocurrent depressurization-pressure equalization. Normally, such additional amount of oxygen is not so transferred to the other bed, but is be discharged as waste during the evacuation step. Secondly, the added pressure equalization occurs simultaneously with the repressurization/evacuation portion of the cycle in the two beds, and the time employed for pressure equalization alone is shortened. This reduces the unload time for the feed and vacuum blowers and results in better utilization of such equipment. This feature also sharpens the impurity front of the more selectively adsorbable component in the bed, enhancing desired product recovery, and has the potential for shortening the overall cycle time and increasing the amount of air processed by the system. The improved recovery and smaller percentage of unload time collectively serve to increase the capacity of the system. It should also be noted that, due to increased equipment utilization, the operating pressures of the equipment are changed. The total power usage thereof increases, but is offset by the increase achieved in the product capacity of the system. The unit power requirements will remain about the same, or improve depending in the magnitude of the increase in production capacity.

The invention will thus be seen as a highly advantageous adaptation of the VPSA processing cycle described in the background section above. It provides an improvement of a generally 5–10% increase in product capacity and upto a 5% reduction in unit power as compared to said previous VPSA cycle. As indicated above, the actual power usage increases in the practice of the vis-a-vis the previous cycle, but due to increase in capacity, the unit power will be equal to, or often improved, over said previous cycle. Under such circumstances, the extent of the power savings achieved is variable based on the change in total power consumption and the increase in capacity obtained in any given embodiment of the invention. It should be noted that the advantages achieved in the practice of the invention are accomplished essentially without change in the equipment or in the VPSA system layout, and with only minor changes to the control logic employed in automated embodiments of the previous cycle. Thus, it will be appreciated that the advantageous VPSA processing sequence of the invention provides significant cost savings without a necessary investment in additional capital for the VPSA system. Additionally, the advantages offered by the processing sequence of the invention are a result of higher equipment utilization and improved product recovery resulting from greater pressure equalization flow. Such advantages are achieved, it should be noted, regardless of the absolute operating pressures used in the VPSA system for any given air or other gas separation operations.

The invention is hereinafter further described with reference to the drawing in which the overlapping pressure equalization-rising and feed gas pressurization step and the overlapping pressure equalization-falling and evacuation step are incorporated into the processing sequence of the previous PSA/VPSA processing cycle referred to above. The processing steps are described with respect to the cycle as carried out in Bed A of a two bed VPSA system, commencing with the pressure equalization-rising step in which Bed A is increased in pressure from a lower desorption pressure to an intermediate pressure. It will be understood that the same processing steps are carried out in Bed B in the same sequence, but are coordinated so that Bed B is being depressurized from the upper adsorption pressure during the time that Bed A is being pressurized to said upper adsorption pressure.

In Step 1, as illustrated in FIG. 1 of the drawings, Bed A, initially at its lower, subatmospheric desorption pressure, is increased in pressure to an intermediate pressure level by the passage to the top (product end) of Bed A of gas removed from Bed B, initially at its upper adsorption pressure, by the current depressurization of Bed B release of gas from the top thereof. During this step, the feed and vacuum blowers employed in the VPSA system are unloaded.

During the next step, Overlap Step 1A, as illustrated in FIG. 1A, the pressure equalization-rising of Step 1 is continued in Bed A, with feed gas being introduced simultaneously to the bottom (feed end) of Bed A to further increase the pressure to the desired upper adsorption pressure. During this time, Bed B likewise undergoes simultaneous processing as described below with respect to Step 4A in Bed A. Upon Bed A reaching the upper adsorption pressure, additional feed gas is introduced to the bottom of Bed A and product gas, i.e. the less readily adsorbable component of the feed gas mixture, is withdrawn from the top of said Bed A in Step 2 of the processing sequence, as illustrated in FIG. 2 of the drawings. Such addition of feed gas to the bottom of the bed is continued during Step 3, as illustrated in FIG. 3 of the drawings, with a portion of the product gas recovered from the top of Bed A being diverted for passage to the top of Bed B for use as purge gas therein. The addition of feed gas to Bed A and the recovery of product therefrom, is generally continued until an adsorption front of the more readily adsorbable component that forms at the feed end of Bed A has advanced through the bed to the vicinity of the top of the bed, without breakthrough from the bed and undesired discharge of the more readily adsorbable component into the product stream.

Upon completion of Step 3, the regeneration of Bed A begins with Step 4, illustrated in FIG. 4 of the drawings, a cocurrent depressurization-pressure equalization step in which gas is withdrawn from the top of Bed A and is passed to the top of Bed B for pressure equalization purposes. During this time, the feed end evacuation blowers are unloaded. Such pressure equalization is continued in Overlap Step 4A, illustrated in FIG. 4A of the drawings, during which time Bed A is simultaneously depressurized by the withdrawal of the more readily adsorbable component of the feed gas from the bottom of Bed A for the countercurrent depressurization thereof. During this overlap step, Bed B is simultaneously further repressurized by the addition of feed gas to the bottom of the bed.

Following Overlap Step 4A, Bed A is further depressurized by countercurrent depressurization in which additional quantities of the more readily adsorbable component are withdrawn from the bottom of Bed A in Step 5, illustrated in FIG. 5 of the drawings. Bed A is depressurized in this step to the lower desorption pressure, i.e. a subatmospheric (vacuum) desorption pressure in VPSA systems, in furtherance of the regeneration of Bed A.

Such regeneration is continued in Step 6, illustrated in FIG. 6 of the drawing wherein a portion of the product gas withdrawn from the top of Bed B is diverted for passage as purge gas to the top of Bed A for countercurrent flow through said Bed A from the top to the bottom thereof, to facilitate desorption of the more readily adsorbable component and its removal from the bottom of Bed A at the lower desorption pressure together with said purge gas.

During Overlap Step 4A, Step 5 and Step 6, gas is discharged from the bottom of Bed A for bed regeneration purposes. Such gas, rich in the more readily adsorbable component, is typically discharged to waste, although it may have some use outside the subject PSA/VPSA system in gas/air separation.

Upon completion of Step 6, Bed A is in a regenerated condition at the lower desorption pressure ready for repressurization and the introduction of additional quantities of feed gas thereto, commencing with the pressure equalization of Step 1, as cyclic operation of the process is continued.

It will be seen from the above that the process of the invention is an adaptation of the previous PSA/VPSA processing cycle, wherein new overlap seeps, i.e. Step 1A and Step 4A, are created, with the rest of the cycle, i.e. the continuation of the feed step and the purge step, remaining essentially the same as in the previous cycle. Those skilled in the art will appreciate that the overall cycle time, and the individual step times, can be adjusted to attain the desired process pressures and performance results. In particular, the pressure equalization of Steps 1 and 4 can be decreased as time is added for the overlap portions of the cycle, i.e. Steps 1A and 4A. Thus, the total cycle time for the practice of the invention can remain about the same as that of the previous VPSA cycle referred to above, or, in various embodiments, can be reduced, typically by 1–2 seconds. It should also be noted that the pressure at the end of the regular pressure equalization-rising step is lower than with said previous cycle, but the continuation of the bed-to-bed pressure equalization flow during the next succeeding overlap step, i.e. Step 1A, allows the pressure of the bed to continue to rise to a pressure greater than would have been allowed during the pressure equalization portion of the previous cycle. As indicated above, the pressure equalization-rising step of the previous cycle terminates, in the particular embodiment referred to, when the bed has reached about 0.67 atm. With the overlap of steps in the practice of the invention, the feed gas introduction overlap would begin at a lower pressure, e.g. 0.60 atm., and the pressure equalization would terminate at a higher pressure than previously, e.g. 0.77 atm. Similarly, for the overlap of pressure equalization-falling and evacuation, the evacuation overlap would begin, in the illustrative embodiment, at 1.14 atm, and the pressure equalization-falling flow would conclude at about 0.83 atm, compared to the previous cycle wherein pressure equalization flow would end and evacuation began at approximately 1.07 atm.

Although the invention is described above with respect to a preferred set of conditions for a particular illustrative embodiment, it will be understood that the invention can be practiced, in said VPSA embodiment, with a range of desirable pressure conditions in practical commercial operations. Thus, the lower desorption pressure will typically vary from about 0.3 to about 0.75 atm, with the upper adsorption pressure being typically from about 1.3 to about 1.6 atm. In a particularly preferred embodiment consistent with the illustrative example above, the lower desorption pressure is about 0.37 atm., and the upper adsorption pressure is from about 1.3 to about 1.5 atm.

As indicated above, the invention enables product recovery to be increased, and the unload time for the feed and vacuum blowers to be reduced with better utilization of equipment being achieved thereby. The following table provides a comparison, on a relative basis, of the invention with the previous cycle referred to above, and illustrates the improved performance achieved by the overlap cycle, specifically with reference to air separation:

TABLE

| Previous Cycle | | Overlap Cycle | |
| --- | --- | --- | --- |
| 90.0% | oxygen product | 90.0% | oxygen product |
| 55 | TPD oxygen | 61.3 | TPD oxygen |
| 1.0 | unit power (relative) | 0.96 | unit power (relative) |
| 1.0 | oxygen recovery level (relative) | 1.03 | oxygen recovery level (relative) |

Thus, the overlap cycle of the invention achieves, in this example, an increase in production capacity of about 11.4%, together with about a 4% unit power reduction.

It will be understood that, in order to properly operate a VPSA system with the overlap feature of the invention to attain maximum advantage, the cycle times and pressures must be adjusted depending on the system employed, the feed gas mixture to be separated, and the desired performance for a particular embodiment. The time employed for the known cocurrent depressurization-pressure equalization step is reduced, typically, by about 25–50%. The time of the overlap portion of the cycle is approximately the same length of time as the reduction in pressure equalization time for many embodiments. The adsorption/evacuation time can be adjusted to obtain top and bottom pressures that are the same as in the previous, non-overlap cycle. The purge step remains generally unaffected. The bed pressure profiles are observed to change accordingly, so that the feed gas is introduced at a slightly lower pressure, but the pressure at the conclusion of the pressure equalization (bed-to-bed) flow is nigher.

While the invention has been described with reference to certain embodiments thereof, those skilled in the art will appreciate that various changes and modifications can be made in the details thereof without departing from the scope of the invention as set forth in the appended claims. The invention can be used to advantage, as noted above, for highly desirable air separation operations in which oxygen, the less readily adsorbable component of feed air, is recovered as the desired product, with nitrogen, the more readily adsorbable component, being selectively adsorbed on the adsorbent material. Any commercially available adsorbent material capable of selectively adsorbing nitrogen from feed air can be used in the practice of the invention. Well known molecular sieves, such as 5A and 13X zeolitic molecular sieve material, may conveniently be employed. Such materials are generally of the equilibrium type in which an adsorption point of the more selectively adsorbed component, e.g. nitrogen, is formed at the feed end of the bed and advances toward the product end of the bed established in the bed between the more readily adsorbable nitrogen and the less readily adsorbable oxygen component of feed air. While conventional zeolite molecular sieves can be employed as adsorbent in the practice of the invention, various specially modified materials can also be employed, such as adsorbents in the lithium cation forms of zeolite X. Examples of such known materials include L1X adsorbent in which the framework $Si/AlO_2$ molar ratio is from about 2.0 to about 3.0, preferably from 2.0 to 2.5, in which at least 50%, preferably at least 88%, more preferably at least 95%, of the $AlO_2$-tetrahedral units are associated with lithium cations. Mixed cations containing at least about 50% lithium, together with another cation, such as calcium, can also be used in the practice of the invention. While air separation for the production of oxygen has been specifically indicated above, it will be appreciated that the invention can be used for a variety of other feed gas separations, including hydrogen/ammonia, nitrogen/methane, hydrogen/$CO_2$, and other such desirable feed gas separations.

While the invention has been disclosed particularly with respect to desirable two bed systems it is within the scope of the invention to employ any desired multi-bed system, such as a three bed system, provided that the two recited overlap steps are employed in the processing sequence thereof. Furthermore, while the invention has been described in particular with respect to highly desirable VPSA systems in which the lower desorption pressure is in the subatmospheric (vacuum) pressure range, it is also within the scope of this invention to employ the processing sequence described and claimed herein in pressure swing adsorption (PSA) systems in which the lower desorption pressure is at or about atmospheric and is not in the subatmospheric range.

It will also be appreciated that various other changes and modifications can be made so that processing steps are carried out simultaneously so as to reduce the unload time of the machines employed in the practice of the invention. Thus, the overlapped steps may involve not only flow from one vessel to another, but also from a product tank or a separate storage tank to a bed. For example, it is possible, to achieve better utilization of the machinery through overlap of the feed with product pressurization and the evacuation, with countercurrent blowdown of the bed, to atmospheric pressure. Various combinations of this type, applicable also to a one bed system, would be possible to provide an advantage over the previous processing referred to above.

In carrying out the overlap steps of the invention, i.e. Steps 1A and 4A, it will be understood that it is advantageous to begin the simultaneous feed gas repressurization from the bottom of the bed as early as possible, while mitigating fluidization, to provide as much time for said overlap as possible. The feed gas pressurization, and overlap step, are then continued until the pressure equalization between beds has proceeded substantially toward completion of conventional pressure equalization that commonly is terminated with partial, not full, pressure equalization as noted above. It should be noted, however, that feed gas is generally introduced to the feed, or bottom, end of the bed, e.g. Bed A in Overlap Step 1A or Bed B in Overlap Step 4A, only after pressure equalization has increased the pressure of the bed being repressurized from its lower desorption pressure to an intermediate pressure level at which the introduction of feed gas to the bottom thereof will not cause undesirable bed fluidization or bed lifting effects.

By increasing the amount of feed air or other gas processed by the system in a given unit of time, the invention enhances the overall efficiency of the system, reduces the power requirements thereof, and expands the adsorptive capacity of PSA/VPSA systems. The invention thus represents an important advantageous, commercially desirable approach of achieving significant industrial gas separation by the use of convenient pressure swing adsorption technology.

We claim:

1. In a pressure swing adsorption process for the separation of the components of a feed gas mixture in an adsorption-desorption-repressurization cycle in an adsorption system having at least two adsorbent beds, each having a feed end and a product end, and containing adsorbent material capable of selectively adsorbing a more readily adsorbable component from said feed gas, each bed, on a cyclic basis, undergoing a processing sequence comprising the following steps:

(a) partial repressurization from a lower desorption pressure to an intermediate pressure by passing gas withdrawn from the product end of another bed in the system to the product end of each said bed for partial pressure equalization between each said bed and said another bed;

(b) further partial repressurization from said intermediate pressure by passing product gas from the product end of another bed to the product end of each such bed, as in step (a) above, together with simultaneously introducing the feed gas mixture to the feed end of the bed for repressurization of each such bed to an upper adsorption pressure, said further partial repressurization, as in step (a) above, being terminated upon approaching full pressure equalization between the beds, with the introduction of the feed gas mixture to the feed end of the bed continuing to increase the pressure of the bed to an upper adsorption pressure;

(c) introducing additional quantities of the feed gas mixture to the feed end of each such bed at the upper adsorption pressure, with the more readily adsorbable component being selectively adsorbed by the adsorbent material, and the less readily adsorbable component passing through each said bed and being recovered therefrom as a desired product gas stream;

(d) introducing additional quantities of the feed gas mixture to the feed end of each such bed, as in step (c), with the passage of at least a part of the less readily adsorbable component recovered from the product end of each such bed being diverted from the product gas stream for bed purge purposes;

(e) cocurrent depressurization from the upper adsorption pressure to said intermediate pressure by discharging gas from the product end of each said bed, the discharged gas being passed to the product end of another bed to be repressurized in step (a), for partial pressure equalization between the beds;

(f) further partial depressurization from said intermediate pressure reached in step (e), by discharging gas from the product end of each said bed for passage to the product end of another bed, as in step (e) above, together with the simultaneous countercurrent depressurization of each said bed by discharging gas from the feed end thereof, said further partial depressurization being terminated upon approaching, as in step (b) above, said full pressure equalization between each said bed and said another bed;

(g) further countercurrent depressurization of each said bed by withdrawing additional gas from the feed end thereof to reduce the pressure thereof to the lower desorption pressure and to discharge more readily adsorbable component from each said bed;

(h) passing less readily adsorbable component recovered from the product end of another bed in the adsorption system and diverted for purge purposes to the product end of each said bed for passage therethrough as purge gas to facilitate the desorption and removal of said more readily adsorbable component from the feed end of each said bed; and (i) repeating the processing sequence of steps (a)–(h) as cyclic operation of the process in each said bed is continued, the time consumed by the pressure equalization of each said bed in steps (a) and (e), during which feed and exhaust blowers employed in the practice of the process are unloaded, is reduced by simultaneous, overlap steps (b) and (f), whereby the amount of feed gas processed in a given period of time is increased.

2. The process of claim 1 in which the lower desorption pressure is a sub-atmospheric desorption pressure.

3. The process of claim 2 in which the adsorption system contains two adsorbent beds.

4. The process of claim 1 in which the adsorption system contains two adsorbent beds.

5. The process of claim 1 in which the feed gas mixture comprises air, the less readily adsorbable component comprises oxygen, and the more readily adsorbable component comprises nitrogen.

6. The process of claim 5 in which the lower desorption pressure is a sub-atmospheric desorption pressure.

7. The process of claim 6 in which the adsorption system contains two adsorbent beds.

8. The process of claim 7 in which the lower desorption pressure is from about 0.3 to about 0.75 atm, and the upper adsorption pressure is from about 1.3 to about 1.6 atm.

9. The process of claim 8 in which the lower desorption pressure is about 0.37 atm, and the upper adsorption pressure is from about 1.3 to about 1.5 atm.

10. The process of claim 9 in which step (b) begins with the intermediate pressure reached in step (a) being about 0.60 atm, and the pressure equalization portion of said step (b) terminates at about 0.77 atm.

11. The process of claim 9 in which step (f) begins at about 1.14 atm and terminates at about 0.83 atm.

12. The process of claim 1 in which, in step (c), feed gas is introduced to the feed end of the bed at the upper adsorption pressure, with recovery of the less readily adsorbable component passing through the bed and being recovered therefrom, until an adsorption front of the more readily adsorbable component that forms at the feed end of the bed has advanced through the bed to the vicinity of the product end thereof, without breakthrough of the more readily adsorbable component from the bed into the product gas stream.

13. The process of claim 12 in which the adsorbent material is an equalibrium-type adsorbent capable of forming said adsorption front of the more readily adsorbable component in the bed.

* * * * *